US012547842B2

(12) United States Patent
Matsui

(10) Patent No.: US 12,547,842 B2
(45) Date of Patent: Feb. 10, 2026

(54) DIALOGUE SUPPORT SYSTEM AND DIALOGUE SUPPORT METHOD

(71) Applicant: Hitachi, Ltd., Tokyo (JP)

(72) Inventor: Tadashi Matsui, Tokyo (JP)

(73) Assignee: HITACHI, LTD., Tokyo (JP)

( * ) Notice: Subject to any disclaimer, the term of this patent is extended or adjusted under 35 U.S.C. 154(b) by 133 days.

(21) Appl. No.: 18/372,187

(22) Filed: Sep. 25, 2023

(65) Prior Publication Data

US 2024/0211700 A1 Jun. 27, 2024

(30) Foreign Application Priority Data

Dec. 23, 2022 (JP) ................................ 2022-206654

(51) Int. Cl.
*G06F 40/35* (2020.01)
*G06F 16/3329* (2025.01)
*G06F 40/40* (2020.01)

(52) U.S. Cl.
CPC .......... *G06F 40/35* (2020.01); *G06F 16/3329* (2019.01); *G06F 40/40* (2020.01)

(58) Field of Classification Search
CPC ....... G06F 40/35; G06F 16/3329; G06F 40/40
See application file for complete search history.

(56) References Cited

U.S. PATENT DOCUMENTS

| 10,360,265 | B1* | 7/2019 | Agarwal | ............ | G10L 15/1815 |
| 2004/0030541 | A1* | 2/2004 | Chou | ...................... | G09B 7/02 704/2 |
| 2018/0357286 | A1* | 12/2018 | Wang | .................. | G06F 16/3329 |
| 2021/0026858 | A1* | 1/2021 | Jauhari | ............. | G06F 16/24578 |
| 2021/0150150 | A1* | 5/2021 | Wu | ...................... | G06F 16/3329 |

FOREIGN PATENT DOCUMENTS

JP 2020-115244 A 7/2020

OTHER PUBLICATIONS

Tian, Empathetic And Emotionally Positive Conversation Systems with an Emotion-specific Query-Response Memory, Dec. 11, 2022, Findings of the Association for Computational Linguistics: EMNLP 2022, whole document (Year: 2022).*

* cited by examiner

*Primary Examiner* — Sonia L Gay
(74) *Attorney, Agent, or Firm* — MATTINGLY & MALUR, PC

(57) ABSTRACT

A dialogue support system holds question/answer pair candidates including a question sentence vector, an emotion vector indicating a question emotion, and an answer sentence vector, outputs a question/answer pair based on question/answer pair candidates included in a first group as a sentence dependence question/answer pair in a case where it is determined that a variance of emotion vectors included in a first group based on similarity between answer sentence vectors and similarity between the question sentence vectors is large, and outputs a question/answer pair based on question/answer pair candidates included in a second group as an emotion dependence question/answer pair in a case where it is determined that a variance of question sentence vectors included in a second group based on similarity between the answer sentence vectors and similarity between the emotion vectors is large.

8 Claims, 8 Drawing Sheets

FIG. 3

RESPONSE HISTORY DB 104

| ID | CUSTOMER VOICE | OPERATOR VOICE | OPERATOR NUMBER | RESPONSE EVALUATION | ... |
|---|---|---|---|---|---|
| ID001 | cus1.wav | ope1.wav | op001 | GOOD | ... |
| ID002 | cus2.wav | ope2.wav | op002 | BAD | ... |
| ... | ... | ... | ... | ... | ... |

FIG. 4

FAQ DB ~106

| ID | TITLE | QUESTION SENTENCE | QUESTION SENTENCE VECTOR | SENTENCE DEPENDENCE FLAG | EMOTION | EMOTION VECTOR | EMOTION DEPENDENCE FLAG | ANSWER SENTENCE | ANSWER SENTENCE VECTOR |
|---|---|---|---|---|---|---|---|---|---|
| FAQ0001 | I WANT TO MAKE CONTRACT EARLY (CALM) | I WANT TO MAKE CONTRACT EARLY | (0.3, -0.1, ....) | 1 | CALM | (0, 1, 2 ....) | 1 | CAN MAKE CONTRACT VIA WEB OR TELEPHONE | (0.1, 0.2, ....) |
| FAQ0002 | I WANT TO MAKE CONTRACT EARLY (ANGRY) | I WANT TO MAKE CONTRACT EARLY | (0.3, -0.1, ....) | 1 | ANGER | (2, 0, 3 ....) | 1 | ACCEPTED ON THIS PHONE | (0.8, 0.4, ....) |
| FAQ0003 | CUSTOMER ANGER | - | - | 0 | ANGER | (2, 0, 3 ....) | 1 | I'M VERY SORRY | (0.4, 0.2, ....) |
| FAQ0004 | PAYMENT DATE INQUIRY | WHEN IS THE PAYMENT DATE? | (0.2, -0.4, ....) | 1 | - | - | 0 | IT IS FIRST DAY OF EVERY MONTH | (0.9, 0.3, ....) |
| ... | ... | ... | ... | ... | ... | ... | ... | ... | ... |

31 32 33 34 35 36 37 38 39 40

DIALOGUE SUPPORT SYSTEM AND DIALOGUE SUPPORT METHOD

CLAIM OF PRIORITY

The present application claims priority from Japanese patent application JP 2022-206654 filed on Dec. 23, 2022, the content of which is hereby incorporated by reference into this application.

BACKGROUND OF THE INVENTION

1. Field of the Invention

The present invention relates to a dialogue support system and a dialogue support method.

2. Description of the Related Art

In a call center, an operator support system having a function of converting utterance content by voice recognition into text, estimating an answer from the text using frequently asked questions (FAQ), and presenting the estimated answer is used in order to assist skill shortage of a new operator.

As a background art of the present invention, there is JP 2020-115244 A. This publication describes that "An operator reception support system considers emotions of a customer and an operator and makes an appropriate reception method and proposal (answer) to the operator, and includes a contact center 1 connected to an end user terminal 2 via a network. The operator reception support system stores utterance content and emotion analysis results of the operator and the customer in the dialogue data storage device, so that the operator management device can confirm the data. In the operator management device, when a specific keyword is uttered or when a certain threshold value is set for each emotion degree of the customer and the operator and the emotion degree exceeds the threshold value, an appropriate response is proposed to the operator or a warning is transmitted to the supervisor." (see Abstract).

SUMMARY OF THE INVENTION

The technique described in JP 2020-115244 A searches for and presents an FAQ based on utterance content and an emotion analysis result, but a method for automatically generating such an FAQ is not disclosed in JP 2020-115244 A. Therefore, according to an aspect of the present invention, a question/answer pair is automatically generated in consideration of a case where an answer sentence depends on a question sentence and a case where an answer sentence depends on a motion of a questioner.

In order to solve the above problems, an aspect of the present invention adopts the following configuration. A dialogue support system includes a processor, and a memory, wherein the memory holds a plurality of question/answer pair candidates each including a question sentence vector indicating a sentence of question by a questioner, an emotion vector indicating a question emotion that is an emotion of the questioner when the question is asked, and an answer sentence vector indicating a sentence of an answer to the question by a respondent, and question/answer pair information in which a question/answer pair is stored, and the processor generates, from the plurality of question/answer pair candidates, a first group based on similarity between the answer sentence vectors and similarity between the question sentence vectors, and a second group based on similarity between the answer sentence vectors and similarity between the emotion vectors, stores, in a case where it is determined that a variance of the emotion vectors of question/answer pair candidates included in the first group is large based on a predetermined condition, a question/answer pair based on the question/answer pair candidates included in the first group in the question/answer pair information as a sentence dependence question/answer pair in which an answer sentence to a question depends on a sentence of the question, and stores, in a case where it is determined that a variance of the question sentence vectors of question/answer pair candidates included in the second group is large based on a predetermined condition, a question/answer pair based on the question/answer pair candidates included in the second group in the question/answer pair information as an emotion dependence question/answer pair in which an answer sentence to a question depends on the question emotion corresponding to the question.

Therefore, according to an aspect of the present invention, a question/answer pair is automatically generated in consideration of a case where an answer sentence depends on a question sentence and a case where an answer sentence depends on a motion of a questioner.

Problems, configurations, and effects other than those described above will become apparent from the following description of embodiments.

BRIEF DESCRIPTION OF THE DRAWINGS

FIG. 3 is a diagram illustrating an example of a data structure of a response history DB according to the first embodiment;

FIG. 4 is a diagram illustrating an example of a data structure of an FAQ DB in the first embodiment;

DESCRIPTION OF THE PREFERRED EMBODIMENTS

Figure 1:
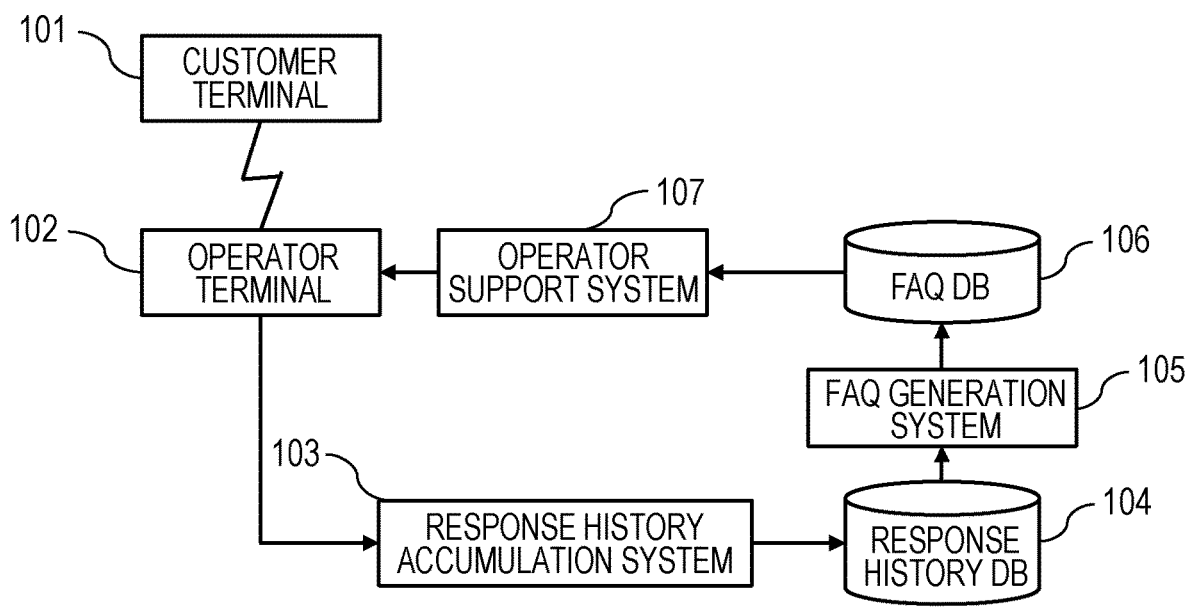
FIG. 1 is a block diagram illustrating a configuration example of a dialogue support system according to the first embodiment.

Hereinafter, embodiments of the present invention will be described in detail with reference to the drawings. In the present embodiment, the same components are denoted by the same reference numerals in principle, and repeated description will be omitted. It should be noted that the present embodiment is merely an example for realizing the present invention, and does not limit the technical scope of the present invention.

First Embodiment

Hereinafter, embodiments of the present invention will be described with reference to FIGS. 1 to 9. In the present embodiment, an FAQ indicating an answer sentence corresponding to at least one of a question sentence by a customer and an emotion (question emotion) of the customer when the customer asks a question is generated from dialogue voices between the customer and the operator in a call center. Hereinafter, processing of collecting voices for generating FAQs, processing of generating an FAQ database from the collected voices, processing of searching FAQs during dialogue between a customer and an operator, and the like will be described.

Note that, in the present embodiment, the FAQ does not simply mean "frequently asked questions", but is a concept including a question (not necessarily frequently asked) and an answer corresponding to the question. Specifically, in the present embodiment, the FAQ indicates at least one of a question sentence and a question emotion and an answer corresponding to the at least one.

FIG. 1 is a block diagram illustrating a configuration example of a dialogue support system. The dialogue support system includes, for example, a customer terminal 101, an operator terminal 102, a response history accumulation system 103, a response history DB (DataBase) 104, an FAQ generation system 105, an FAQ DB 106 (an example of question/answer pair information), and an operator support system 107.

A dialogue between the customer (an example of the questioner) and the operator (an example of the respondent) is performed between the customer terminal 101 and the operator terminal 102. That is, the customer terminal 101 receives a voice uttered by the customer from a microphone or the like to transmit the voice to the operator terminal 102, and the operator terminal 102 outputs the utterance voice from a speaker or the like. The operator terminal 102 receives a voice uttered by the operator from a microphone or the like to transmit the voice to the customer terminal 101, and the customer terminal 101 outputs the utterance voice from a speaker or the like.

Further, the operator terminal 102 transmits a dialogue voice between the customer and the operator to the response history accumulation system 103. The response history accumulation system 103 records the dialogue voice and stores the recorded dialogue voice (for example, in a state in which a voice uttered by a customer and a voice uttered by an operator are separated) in the response history DB 104.

The FAQ generation system 105 automatically generates an FAQ based on the dialogue voice stored in the response history DB 104 and stores the generated FAQ in the FAQ DB 106. The operator support system 107 receives the dialogue voice between the operator and the customer from the operator terminal 102, searches the FAQ DB 106 for an FAQ corresponding to the question sentence by the customer indicated by the dialogue voice and the question emotion of the customer, and presents the FAQ to the operator terminal 102, whereby the FAQ DB 106 is utilized for supporting the operator.

Note that each of the response history DB 104 and the FAQ DB 106 may be a computer independent from another system as a database server. For example, the response history DB 104 may be stored in an auxiliary storage device included in the response history accumulation system 103, and the FAQ DB 106 may be stored in an auxiliary storage device included in the FAQ generation system 105 or an auxiliary storage device included in the operator support system 107.

Furthermore, at least some terminals and systems included in the dialogue support system may be integrated, and specifically, for example, at least some of the operator terminal 102, the response history accumulation system 103, the FAQ generation system 105, and the operator support system 107 may be integrated.

Figure 2:
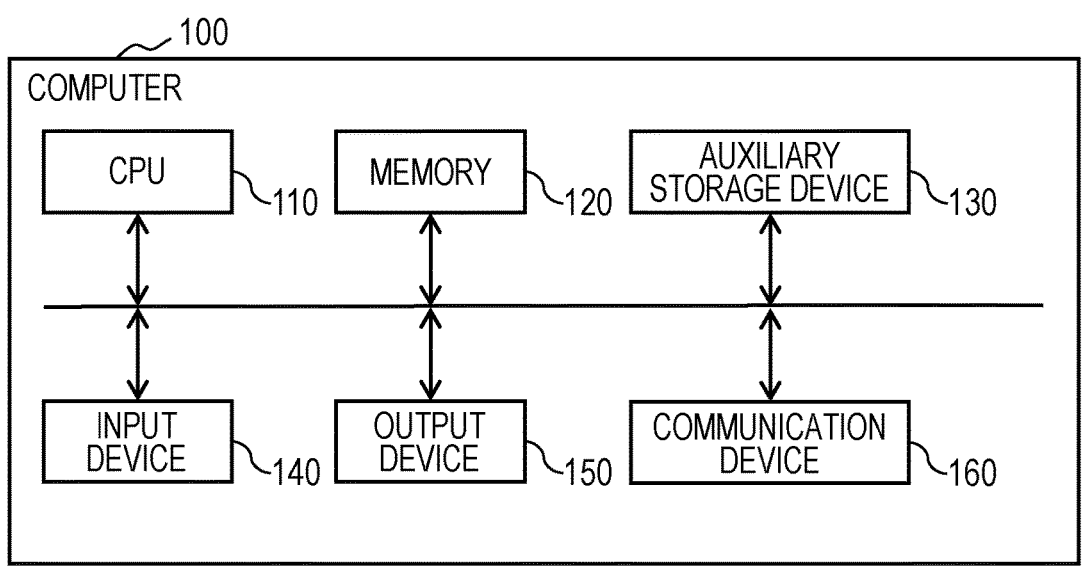
FIG. 2 is a block diagram illustrating a hardware configuration example of each system included in the dialogue support system and a computer constituting each terminal in the first embodiment.

FIG. 2 is a block diagram illustrating a hardware configuration example of each system included in the dialogue support system and a computer constituting each terminal. A computer 100 includes, for example, a central processing unit (CPU) 110, a memory 120, an auxiliary storage device 130, an input device 140, an output device 150, and a communication device 160.

The CPU 110 includes a processor and executes the program stored in the memory 120. The memory 120 includes a read only memory (ROM) that is a nonvolatile storage element and a random access memory (RAM) that is a volatile storage element. The ROM stores an invariable program (for example, a basic input/output system (BIOS)) and the like. The RAM is a high-speed and volatile storage element such as a dynamic random access memory (DRAM), and temporarily stores a program executed by the CPU 110 and data used when the program is executed.

The auxiliary storage device 130 is, for example, a large-capacity and nonvolatile storage device such as a magnetic storage device (hard disk drive (HDD)) or a flash memory (solid state drive (SSD)), and stores a program executed by the CPU 110 and data used at the time of executing the program. That is, the program is read from the auxiliary storage device 130, loaded into the memory 120, and executed by the CPU 110.

Note that some or all of the functions of the function units included in each system included in the dialogue support system may be realized by hardware such as an application specific integrated circuit (ASIC) or a field-programmable gate array (FPGA), for example.

Furthermore, the information used by the dialogue support system may be expressed by any data structure without depending on the data structure. For example, an appropriately selected data structure from a table, list, database, or queue may store the information.

The input device 140 is a device that receives an input from an operator, such as a keyboard or a mouse. In addition, the input device 140 of each of the computer 100 constituting the customer terminal 101 and the computer 100 constituting the operator terminal 102 may include a microphone for receiving a voice. The output device 150 is a device that outputs the execution result of the program in a format that can be visually recognized by the operator, such as a display device or a printer. In addition, the input device 140 of each of the computer 100 constituting the customer terminal 101 and the computer 100 constituting the operator terminal 102 may include a speaker for outputting a voice.

The communication device 160 is a network interface device that controls communication with other devices according to a predetermined protocol. Furthermore, the communication device 160 includes, for example, a serial interface such as a Universal Serial Bus (USB).

Some or all of the programs executed by the CPU 110 may be provided from a removable medium (CD-ROM, flash memory, etc.) that is a non-transitory storage medium or an external computer including a non-transitory storage device to the computer 100 via a network, and may be stored in the non-volatile auxiliary storage device 130 that is a non-transitory storage medium. Therefore, the computer 100 may include an interface device that reads data from a removable medium.

Each system and each terminal included in the dialogue support system are a computer system configured on physically one computer 100 or on a plurality of computers 100 configured logically or physically, and may operate in separate threads on the same computer 100 or may operate on a virtual computer constructed on a plurality of physical computer resources.

FIG. 3 is a diagram illustrating a data structure example of the response history DB 104. The response history DB 104 includes, for example, an ID column 21, a customer voice column 22, an operator voice column 23, an operator number column 24, and a response evaluation column 25. The ID column 21 holds an ID for identifying a response history. The customer voice column 22 holds a voice file of a voice (a voice uttered by the customer) input from the customer terminal 101 in the response history. The operator voice column 23 holds a voice file of a voice (a voice uttered by the operator) input from the operator terminal 102 in the response history.

The operator number column 24 holds an operator number for identifying an operator who has performed a customer response in the response history. The response evaluation column 25 holds information indicating evaluation of the customer response by the operator in the response history. In the example of FIG. 3, for example, one of two types of values of "good" and "bad" is stored in each in the response evaluation column 25. Note that the response evaluation column 25 may store an evaluation value indicating evaluation of the customer response at a predetermined number of stages.

FIG. 4 is a diagram illustrating an exemplary data structure of the FAQ DB 106. The FAQ DB 106 includes, for example, an ID column 31, a title column 32, a question sentence column 33, a question sentence vector column 34, a sentence dependence flag column 35, an emotion column 36, an emotion vector column 37, an emotion dependence flag column 38, an answer sentence column 39, and an answer sentence vector column 40. The ID column 31 holds an ID for identifying FAQ. The title column 32 holds a character string indicating a title of the FAQ.

The question sentence column 33 holds a character string indicating a question sentence of the FAQ. The question sentence vector column 34 holds a question sentence vector obtained by vectorizing a question sentence. The sentence dependence flag column 35 holds a sentence dependence flag indicating whether the answer sentence depends on the question sentence (that is, is an answer sentence determined based on the question sentence?).

When the sentence dependence flag is "1", the result indicates that the answer sentence depends on the question sentence, and when the sentence dependence flag is "0", the result indicates that the answer sentence does not depend on the question sentence. Note that, in the record in which the value in the sentence dependence flag column 35 of the FAQ DB 106 is "0", the question sentence may not be registered (that is, no value may be stored or a null value may be stored in the question sentence column 33 and the question sentence vector column 34).

The emotion column 36 holds a character string indicating a question emotion (that is, the emotion of the customer when the question by the question sentence is asked). The emotion vector column 37 holds an emotion vector obtained by vectorizing a question emotion. The emotion dependence flag column 38 holds an emotion dependence flag indicating whether the answer sentence depends on the question emotion (that is, is the answer sentence determined based on the question emotion?).

When the emotion dependence flag is "1", the result indicates that the answer sentence depends on the question emotion, and when the emotion dependence flag is "0", the result indicates that the answer sentence does not depend on the question emotion. Note that the question emotion may not be registered in the record in which the value in the emotion dependence flag column 38 of the FAQ DB 106 is "0" (that is, no value or a null value may be stored in the emotion column 36 and the emotion vector column 37.).

The answer sentence column 39 holds a character string indicating an answer sentence corresponding to the question emotion indicated by the emotion column 36 and the question sentence indicated by the question sentence column 33. The answer sentence vector column 40 holds an answer sentence vector obtained by vectorizing an answer sentence.

Figure 5:
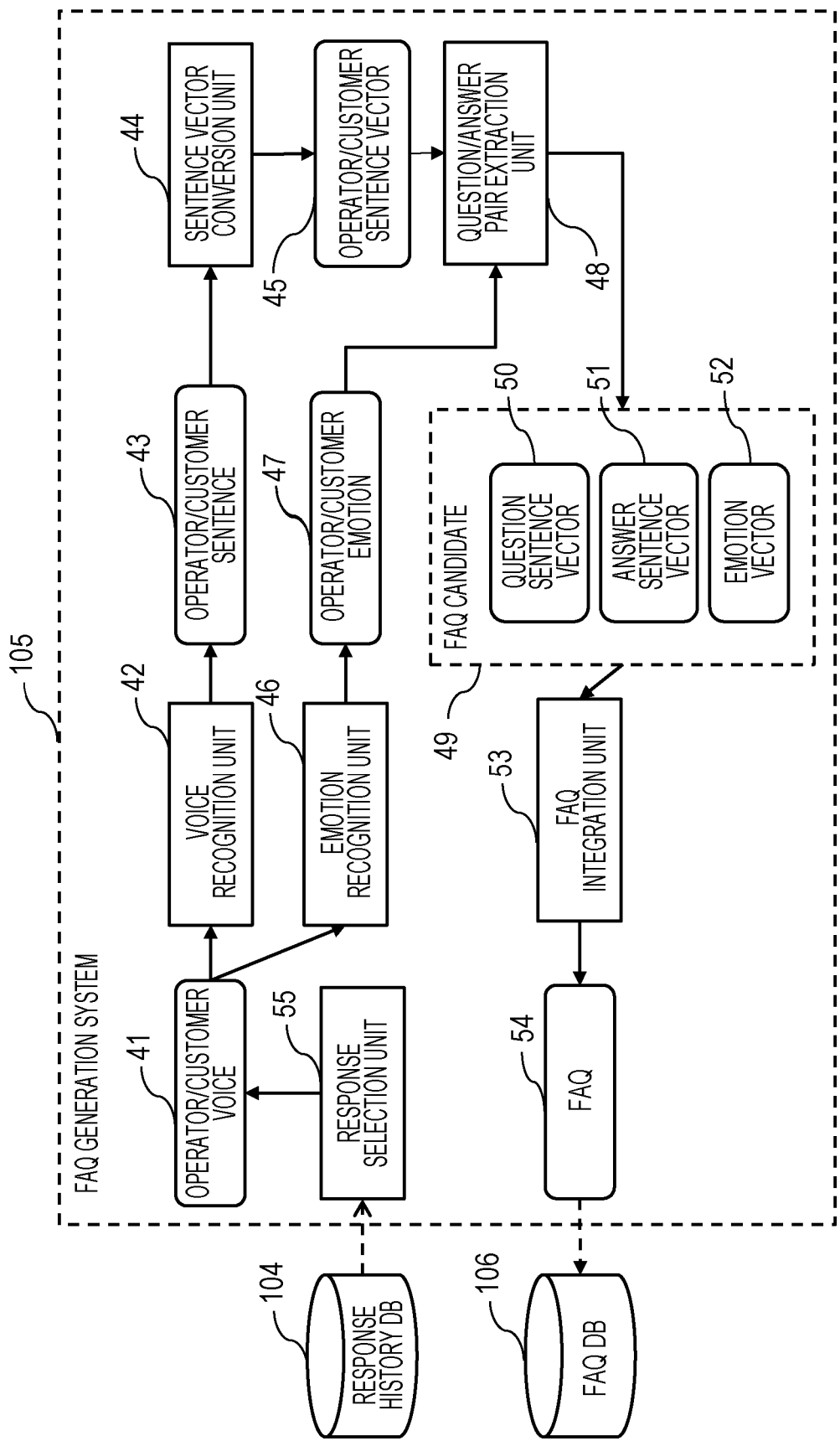
FIG. 5 is a diagram illustrating a functional configuration example of an FAQ generation system in the first embodiment and an outline example of processing by the FAQ generation system.

FIG. 5 is a diagram illustrating a functional configuration example of the FAQ generation system 105 and an outline example of processing by the FAQ generation system 105. The FAQ generation system 105 includes, for example, a response selection unit 55, a voice recognition unit 42, an emotion recognition unit 46, a sentence vector conversion unit 44, a question/answer pair extraction unit 48, and an FAQ combining unit 54, all of which are function units. In addition, the FAQ generation system 105 is connected to the response history DB 104 and the FAQ DB 106 described above.

For example, each function unit illustrated in FIG. 5 is included in the CPU 110 of the computer 100 constituting the FAQ generation system 105. For example, the CPU 110 of the computer 100 constituting the FAQ generation system 105 functions as the response selection unit 55 by operating according to the response selection program loaded in the memory 120 of the computer 100, and functions as the voice recognition unit 42 by operating according to the voice recognition program loaded in the memory 120.

For other systems included in the dialogue support system, the relationship between the CPU 110 of the computer 100 constituting the system, the program loaded into the memory 120 of the computer 100, and the function units included in the system is the same.

An outline of processing by the FAQ generation system 105 will be described. The response selection unit 55 extracts a combination of the operator voice and the customer voice from the response history DB 104. At this time, the response selection unit 55 can create an exemplary FAQ by extracting only a combination of an operator voice corresponding to an operator who is an expert (for example, the FAQ generation system 105 receives the input of the operator number of the expert from the user via the input device 140, or the FAQ generation system 105 holds in advance data in which the operator number of the expert is registered) and a customer voice or only a combination of an operator voice corresponding to a good customer evaluation (the value of the customer evaluation is "good") and a customer voice based on the operator number.

Furthermore, the response selection unit 55 may create an FAQ of an example of a bad customer response by extracting only a combination of an operator voice corresponding to an unskilled operator and a customer voice, or extracting only a combination of an operator voice corresponding to a bad customer evaluation (the value of the customer evaluation is "bad") and a customer voice based on the operator number.

The response selection unit 55 inputs the extracted operator voice and customer voice to the voice recognition unit 42, and the voice recognition unit 42 generates an operator/customer sentence 43 including a text in which the operator voice and the customer voice are written.

The voice recognition unit 42 inputs the operator/customer sentence 43 to the sentence vector conversion unit 44, and the sentence vector conversion unit 44 converts the operator/customer sentence 43 into an operator/customer sentence vector 45 (an example of the dialogue sentence vector) including the sentence vector corresponding to each of the text of the operator voice and the text of the customer voice included in the operator/customer sentence 43.

The response selection unit 55 inputs the extracted operator voice and customer voice to the emotion recognition unit 46, and the emotion recognition unit 46 generates an operator/customer emotion 47 including emotion vector corresponding to each of the operator voice and the customer voice.

The sentence vector conversion unit 44 inputs the operator/customer sentence vector 45 to the question/answer pair extraction unit 48, the emotion recognition unit 46 inputs the operator/customer emotion 47 to the question/answer pair extraction unit 48, and the question/answer pair extraction unit 48 generates an FAQ candidate 49 (an example of a question/answer pair candidate) including a question sentence vector 50, an answer sentence vector 51, and an emotion vector 52. Note that, although details will be described later, there may be an FAQ candidate 49 that does not include the question sentence vector 50. Furthermore, in the example of FIG. 5, the FAQ generation system 105 generates the FAQ candidate 49, but the FAQ candidate 49 may be given by manual input.

In the FAQ candidates 49 generated by the question/answer pair extraction unit 48, there are FAQs with duplicate content. In order to eliminate the duplication, the question/answer pair extraction unit 48 inputs FAQ candidates 49 to an FAQ integration unit 53, and the FAQ integration unit 53 removes the FAQs with duplicate content and generates an official FAQ. Details of the question/answer extraction process by the question/answer pair extraction unit 48 will be described later with reference to FIG. 6.

The FAQ integration unit 53 stores the generated official FAQ in the FAQ DB 106. Details of the FAQ integration process by the FAQ integration unit 53 will be described later with reference to FIG. 7. The above is an outline of a series of processes by the FAQ generation system 105.

Note that, for example, voice recognition unit 42 generates operator/customer sentence 43 from an operator/customer voice 41 by automatic voice recognition in which a voice is input, a text is output, and deep learning is used. In addition, the voice recognition unit 42 may generate the operator/customer sentence 43 from the operator/customer voice 41 by another machine learning method, or may acquire the operator/customer sentence 43 manually written by an input via the input device 140.

Furthermore, the emotion recognition unit 46 generates the operator/customer emotion 47 indicating a transition of the emotion vector of the operator and a transition of the emotion vector of the customer (an example of the questioner emotion) from the operator/customer voice 41 by automatic voice emotion recognition in which, for example, a voice is input and a vector numerically representing the degree of emotions such as delight, anger, sorrow, and pleasure is output, and deep learning is used.

Furthermore, the emotion recognition unit 46 may generate the operator/customer emotion 47 from the operator/customer voice 41 by other machine learning, or may acquire a label of an emotion assigned manually as the operator/customer emotion 47 by input via the input device 140.

In addition, the sentence vector conversion unit 44 performs, for example, morphological analysis on each of the text of the operator voice and the text of the customer voice included in the operator/customer sentence 43, and generates a onehot vector reflecting the result of the morphological analysis, thereby generating the operator/customer sentence vector 45.

Figure 6:
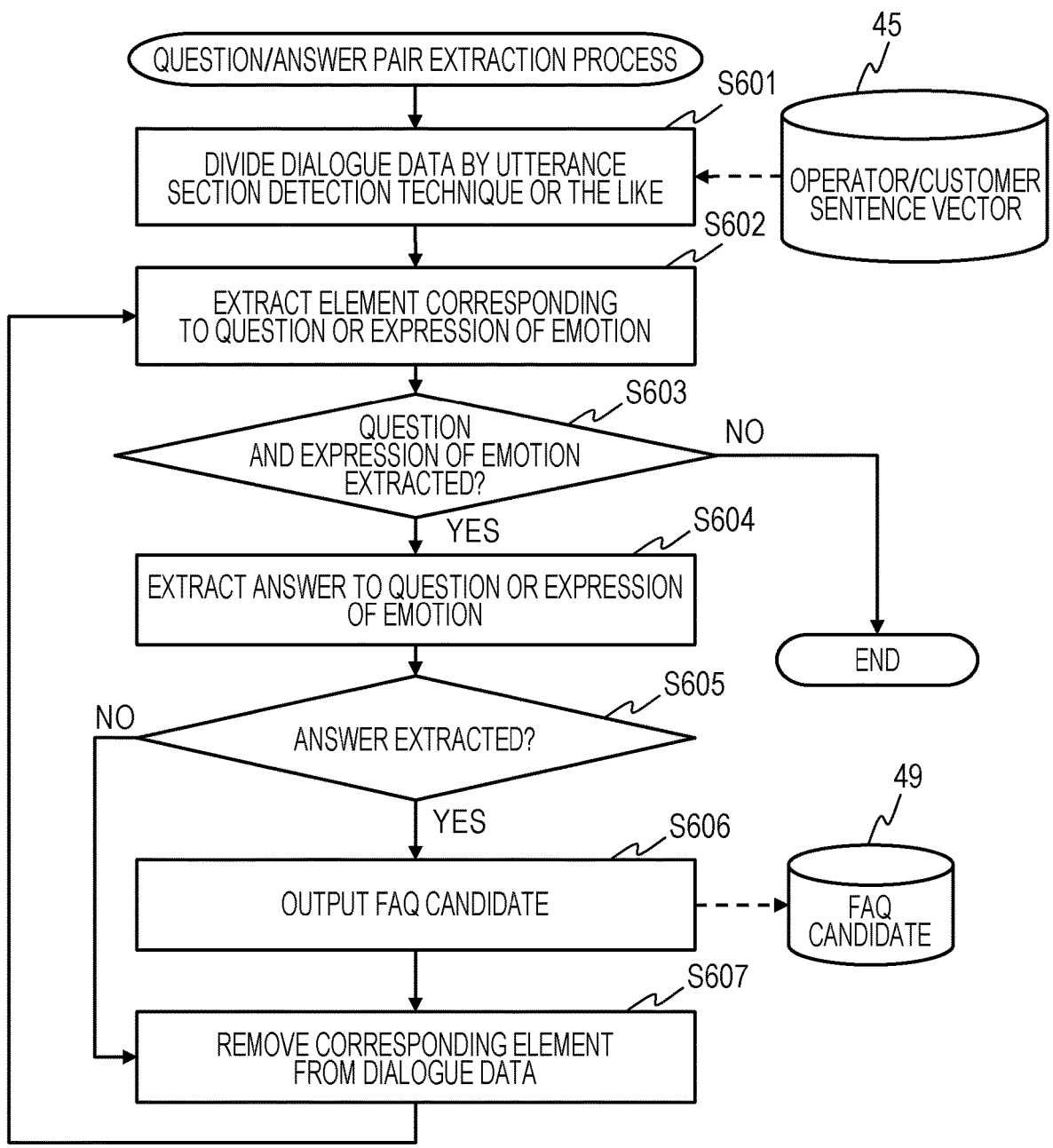
FIG. 6 is a flowchart illustrating an example of a question/answer pair extraction process in the first embodiment.

FIG. 6 is a flowchart illustrating an example of a question/answer pair extraction process. The question/answer pair extraction unit 48 divides the dialogue data indicated by the operator/customer sentence vector 45 into one or more utterance elements by an utterance section detection technique or the like (S601). Note that each of the one or more utterance elements is expressed by, for example, a onehot vector reflecting the result of the morphological analysis described above.

The question/answer pair extraction unit 48 extracts an utterance element corresponding to a question or an utterance element corresponding to an expression of the emotion from the utterance element included in the dialogue data (S602). Specifically, for example, the question/answer pair extraction unit 48 searches for the one or more utterance elements into which the dialogue has been divided in order from the top (In descending order of time of utterance) until the question/answer pair extraction unit extracts an utterance element corresponding to a question or an utterance element corresponding to an expression of the emotion (up to the last utterance element of the dialogue in a case where these utterance elements cannot be extracted).

In step S602, the question/answer pair extraction unit 48 extracts a question from the utterance element of the customer based on the onehot vector, and extracts an utterance element at a timing when the amount of change in the emotion vector of the customer indicated by the operator/customer emotion 47 is large (for example, the amount of change in the norm of the emotion vector is a predetermined value or more) as the expression of the emotion.

The question/answer pair extraction unit 48 determines whether a question or an expression of the emotion has been extracted in the latest step S602 (S603). When the question/answer pair extraction unit 48 determines that the question or the expression of the emotion has not been extracted (S603: NO), the question/answer pair extraction process ends.

When it is determined that the question or the expression of the emotion has been extracted (S603: YES), the question/answer pair extraction unit 48 extracts an answer to the question or the expression of the emotion (S604). Specifically, for example, the question/answer pair extraction unit 48 extracts, as an answer, an utterance element corresponding to the utterance by the operator immediately after the utterance element corresponding to the question or the expression of the emotion.

Furthermore, the answer to the question or the expression of the emotion may include an action other than utterance by the operator. For example, in a case where the customer and the operator have a conversation on the phone, the question/answer pair extraction unit 48 may extract an action (It is assumed that the FAQ generation system 105 holds in advance information of an action taken by an operator) in which the operator puts the phone on hold immediately after the utterance corresponding to the question or the expression of the emotion.

The question/answer pair extraction unit 48 determines whether an answer to the question or the expression of the emotion has been extracted in the latest step S605 (S606). When determining that the answer has been extracted (S606: YES), the question/answer pair extraction unit 48 outputs the FAQ candidate 49 (S607).

Specifically, for example, the question/answer pair extraction unit 48 outputs, as the FAQ candidate 49, a combination of the question sentence vector 50 corresponding to the question extracted in the latest step S602, the answer sentence vector 51 corresponding to the answer extracted in the latest step S605, and the emotion vector 52 of the customer when the question extracted in step S602 is asked or when expression of the emotion extracted in step S602 is made.

Note that, in a case where the question/answer pair extraction unit 48 extracts only the expression of the emotion in the latest step S602, the question sentence vector 50 may not be included in the FAQ candidate 49 in step S606, or the sentence vector indicated by the utterance element of the customer at the timing when the emotion is expressed may be included in the FAQ candidate 49 as the question sentence vector 50.

The question/answer pair extraction unit 48 deletes, from the dialogue data, the top utterance element to the utterance element corresponding to the question or the expression of the emotion extracted in step S602 among the utterance elements of the customer, and the top utterance element to the utterance element corresponding to the answer extracted in step S604 (S607) among the utterance elements of the operator, and the process returns to step S602. Note that, in a case where the question/answer pair extraction unit 48 has not been able to extract an answer in step S604, the question/answer pair extraction unit may not delete the utterance elements of the operator at all or may delete all the utterance elements of the operator in step S607.

Figure 7:
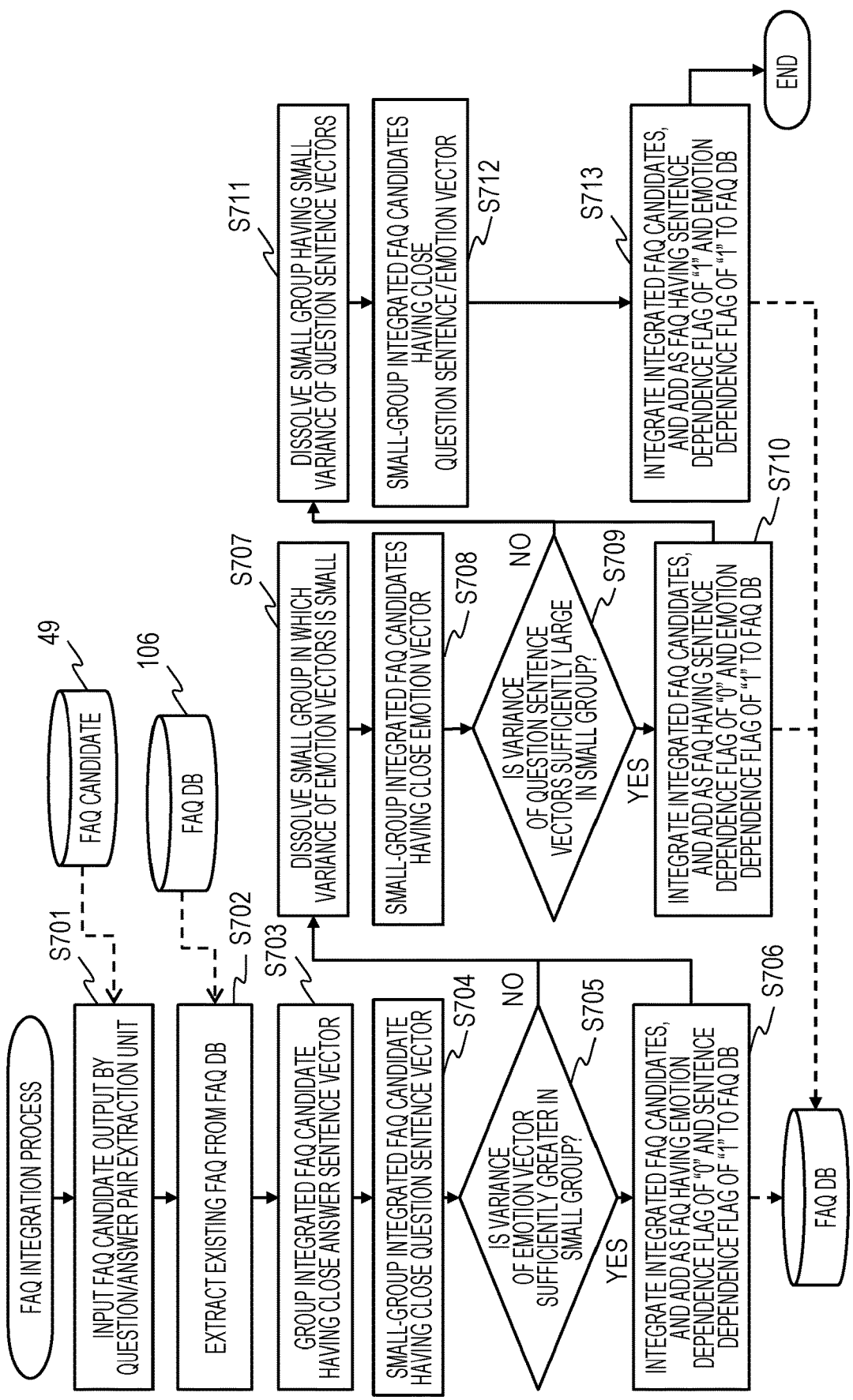
FIG. 7 is a flowchart illustrating an example of an FAQ integration process in the first embodiment.

FIG. 7 is a flowchart illustrating an example of the FAQ integration process. The FAQ integration unit 53 receives an input of the FAQ candidate 49 from the question/answer pair extraction unit 48 (S701). The FAQ integration unit 53 extracts the FAQ (that is, a combination of the question sentence vector, the answer sentence vector, and the emotion vector) indicated by each record from the FAQ DB 106 (S702). Hereinafter, the FAQ extracted in step S702 is also referred to as an existing FAQ, and the FAQ candidate 49 and the existing FAQ are collectively referred to as an integrated FAQ candidate. Note that, in step S702, when extracting the existing FAQ from the FAQ DB 106, the FAQ integration unit 53 may delete all records of the FAQ DB 106.

The FAQ integration unit 53 groups candidates having close answer sentence vectors among the integrated FAQ candidates (S703). Specifically, for example, the FAQ integration unit 53 calculates the cosine similarity between the answer sentence vectors for respective combinations of the integrated FAQ candidates, and determines a combination in which the cosine similarity is equal to or greater than a predetermined threshold value as a combination in which the answer sentence vectors are close to each other. Hereinafter, each group of the integrated FAQ candidates generated in step S703 is also referred to as a large group.

For each of the large groups generated in step S703, the FAQ integration unit 53 small-groups candidates having close question sentence vectors among the integrated FAQ candidates included in the large group (S704). Specifically, for example, the FAQ integration unit 53 calculates cosine similarity between question sentence vectors for respective combinations of the integrated FAQ candidates included in the large group, and determines a combination in which the cosine similarity is a predetermined threshold value or more as a combination in which the question sentence vectors are close to each other.

For each small group (each small group is an example of the first group) generated in step S704, the FAQ integration unit 53 calculates a variance of the emotion vectors of the integrated FAQ candidates included the small group and determines whether there is a small group having a sufficiently large calculated variance (for example, it is larger than a predetermined threshold value) (S705).

Note that the fact that the variance of the emotion vectors is large in the small group generated in step S704 indicates that, although the similarity in the answer sentence and the similarity in the question sentence are high in the integrated FAQ candidates included in the small group, the question sentence has been made by various question emotions, that is, the answer sentence included in the small group depends on the question sentence but does not depend on the question emotion.

In a case where it is determined that there is a small group having a sufficiently large variance (S705: YES), the FAQ integration unit 53 assigns an ID for identifying an FAQ to each of the small groups having a sufficiently large variance, integrates the integrated FAQ candidates included in the small group as one FAQ, and stores the one FAQ in the FAQ DB 106 as an FAQ (an example of a sentence dependence question/answer pair) having a sentence dependence flag of "1" and an emotion dependence flag of "0" (S706), and the process transitions to step S707. Note that the FAQ integration unit 53 deletes the integrated FAQ candidates included in the small group corresponding to each of the FAQs integrated in step S706 from the large group.

In step S706, for example, the FAQ integration unit 53 determines the average of the question sentence vectors, the average of the emotion vectors, and the average of the answer sentence vectors of the integrated FAQ candidates included in the small group having a sufficiently large variance as the question sentence vector, the emotion vector, and the answer sentence vector of one integrated FAQ (that is, stored in the FAQ DB 106), respectively.

Furthermore, in step S706, for example, the FAQ integration unit 53 may determine the question sentence vector closest to the average among the question sentence vectors, the emotion vector closest to the average among the emotion vectors, and the answer sentence vector closest to the average among the answer sentence vectors of the integrated FAQ candidates included in the small group having a sufficiently large variance as the question sentence vector, the emotion vector, and the answer sentence vector of one integrated FAQ (that is, stored in the FAQ DB 106), respectively.

Furthermore, for example, in step S706, for example, the FAQ integration unit 53 may combine the question sentence vectors of the integrated FAQ candidates included in the small group having a sufficiently large variance to generate a question sentence vector indicating a union or a product set (with words as elements) of utterances corresponding to the question sentence, and determine the generated question vector as a question sentence vector of one integrated FAQ (that is, stored in the FAQ DB 106). The same applies to the emotion vector and the answer vector.

Furthermore, for example, for each of the small groups having a sufficiently large variance, the FAQ integration unit 53 determines a question sentence corresponding to a question sentence vector closest to the average among question sentence vectors, an emotion corresponding to an emotion vector closest to the average among the emotion vectors, and an answer sentence corresponding to an answer sentence vector closest to the average among the answer sentence vectors of the integrated FAQ candidates included in the small group having a sufficiently large variance as the question sentence, the emotion, and the answer sentence of the one integrated FAQ (that is, stored in the FAQ DB 106), respectively.

Furthermore, for example, the FAQ integration unit 53 determines a title to be stored in the FAQ DB 106 by receiving an input of a title of an FAQ integrated for each of the small groups having sufficiently large dispersion via the input device 140.

Note that since the emotion dependence flag of the FAQ stored in the FAQ DB 106 in step S706 is "0" (that is, the answer in the FAQ does not depend on the question emotion in the FAQ), the FAQ integration unit 53 may store the emotion and the emotion vector of the FAQ integrated in step S706 in the FAQ DB 106 as a null value or a blank.

In a case where the FAQ integration unit 53 determines that there is no small group having a sufficiently large dispersion (S705: NO), the process proceeds to step S707. The FAQ integration unit 53 dissolves each of the small groups the dispersion of which is determined not to be sufficiently large in step S705 (S707).

For each of the large groups, the FAQ integration unit 53 small-groups candidates having close emotion vectors among the integrated FAQ candidates included in the large group based on cosine similarity as in step S704 (S708).

For each small group (each small group is an example of the second group) generated in step S708, the FAQ integration unit 53 calculates the variance of the question sentence vectors of the integrated FAQ candidates included in the small group and determines whether there is a small group having a sufficiently large calculated variance (for example, it is larger than a predetermined threshold value) (S709).

Note that the fact that the variance of the question sentence vectors is large in the small group generated in step S708 indicates that although the similarity in the answer sentence and the similarity in the question emotion are high in the integrated FAQ candidates included in the small group, various question sentences are uttered in the question emotion, that is, the answer sentence included in the small group depends on the question emotion but does not depend on the question sentence.

In a case where it is determined that there is a small group having a sufficiently large variance (S709: YES), the FAQ integration unit 53 assigns an ID for identifying an FAQ to each of the small groups having a sufficiently large variance, integrates the integrated FAQ candidates included in the small group as one FAQ, and stores the one FAQ as an FAQ (an example of an emotion dependence question/answer pair) having a sentence dependence flag of "0" and an emotion dependence flag of "1" in the FAQ DB 106 (S710), and the process transitions to step S711. Note that the FAQ integration unit 53 deletes the integrated FAQ candidates included in the small group corresponding to each of the FAQs integrated in step S710 from the large group.

Note that the method of integrating the integrated FAQ candidates in step S710 by the FAQ integration unit 53 is similar to the method of integrating the integrated FAQ candidates in step S706, and thus the description thereof will be omitted.

Furthermore, since the sentence dependence flag of the FAQ stored in the FAQ DB 106 in step S710 is "0" (that is, the answer in the FAQ does not depend on the question sentence in the FAQ.), the FAQ integration unit 53 may store the question sentence and the question sentence vector of the FAQ integrated in step S710 in the FAQ DB 106 as a null value or a blank.

In a case where the FAQ integration unit 53 determines that there is no small group having a sufficiently large dispersion (S709: NO), the process proceeds to step S711. The FAQ integration unit 53 dissolves each of the small groups the dispersion of which is determined not to be sufficiently large in step S709 (S711).

For each of the large groups, the FAQ integration unit 53 small-groups candidates having close question sentence vectors and emotion vectors among the integrated FAQ candidates included in the large group based on cosine similarity as in step S704 (S712).

For each of the small groups (each small group is an example of the third group) generated in step S712, the FAQ integration unit 53 assigns an ID for identifying an FAQ, integrates the integrated FAQ candidates included in the small group as one FAQ, and stores the one FAQ in the FAQ DB 106 as an FAQ (an example of the sentence/emotion dependence question/answer pair) having a sentence dependence flag of "1" and an emotion dependence flag of "1" (S713), and the FAQ integration process ends.

Note that, in step S712, even for a single integrated FAQ candidate having no close question sentence vector and no close emotion vector, the FAQ integration unit 53 may generate a small group including the single integrated FAQ candidate. In addition, the method of integrating the integrated FAQ candidates in step S713 by the FAQ integration unit 53 is similar to the method of integrating the integrated FAQ candidates in step S706, and thus the description thereof is omitted.

The FAQ integration unit 53 can generate the FAQ DB 106 that can appropriately respond to the partial matching of the question emotion and/or the question sentence by automatically determining whether the integrated FAQ depends on the question emotion, the question sentence, or both the question emotion and the question sentence while integrating the FAQs in which at least one of the question sentence, the answer sentence, and the question emotion is similar by the above-described FAQ integration process.

Note that, in the above example, the FAQ integration unit 53 has large-grouped the integrated FAQ candidates having close answer sentence vectors in step S703, but may large-group the integrated FAQ candidates having close question sentences in step S703. In this case, the FAQ integration unit 53 small-groups the integrated FAQ candidates having close answer sentence vectors in step S704, determines whether the dispersion of the answer sentence vectors is sufficiently large in step S709, dissolves the small group having small dispersion of the answer sentence vectors in step S711, and small-groups the integrated FAQ candidates having close answer sentence vectors and emotion vectors in step S712.

Furthermore, in the above example, the FAQ integration unit 53 executes the series of processes of steps S704 to S706 first and then executes the series of processes of steps S707 to S710, but may execute the series of processes of steps S707 to S710 first and then execute the series of processes of steps S704 to S706.

Furthermore, the FAQ integration unit 53 may calculate a numerical value indicating the sentence dependence degree and a numerical value indicating the emotion dependence degree and store the calculated numerical values in the FAQ DB 106. The FAQ integration unit 53 calculates, for example, a reciprocal of a variance of vectors that have not been used for small-grouping as these numerical values. That is, for example, the FAQ integration unit 53 calculates the reciprocal of the variance of the question sentence vectors of the integrated FAQ candidates integrated in step S706 as a numerical value indicating the sentence dependence degree, and calculates the reciprocal of the variance of the emotion vectors of the integrated FAQ candidates integrated in step S710 as a numerical value indicating the emotion dependence degree.

Furthermore, for example, also in step S713, the FAQ integration unit 53 may calculate the reciprocal of the variance of the question sentence vectors of the integrated FAQ candidates to be integrated as a numerical value indicating the sentence dependence degree, and may calculate the reciprocal of the variance of the emotion vectors of the integrated FAQ candidates as a numerical value indicating the emotion dependence degree.

Figure 8:
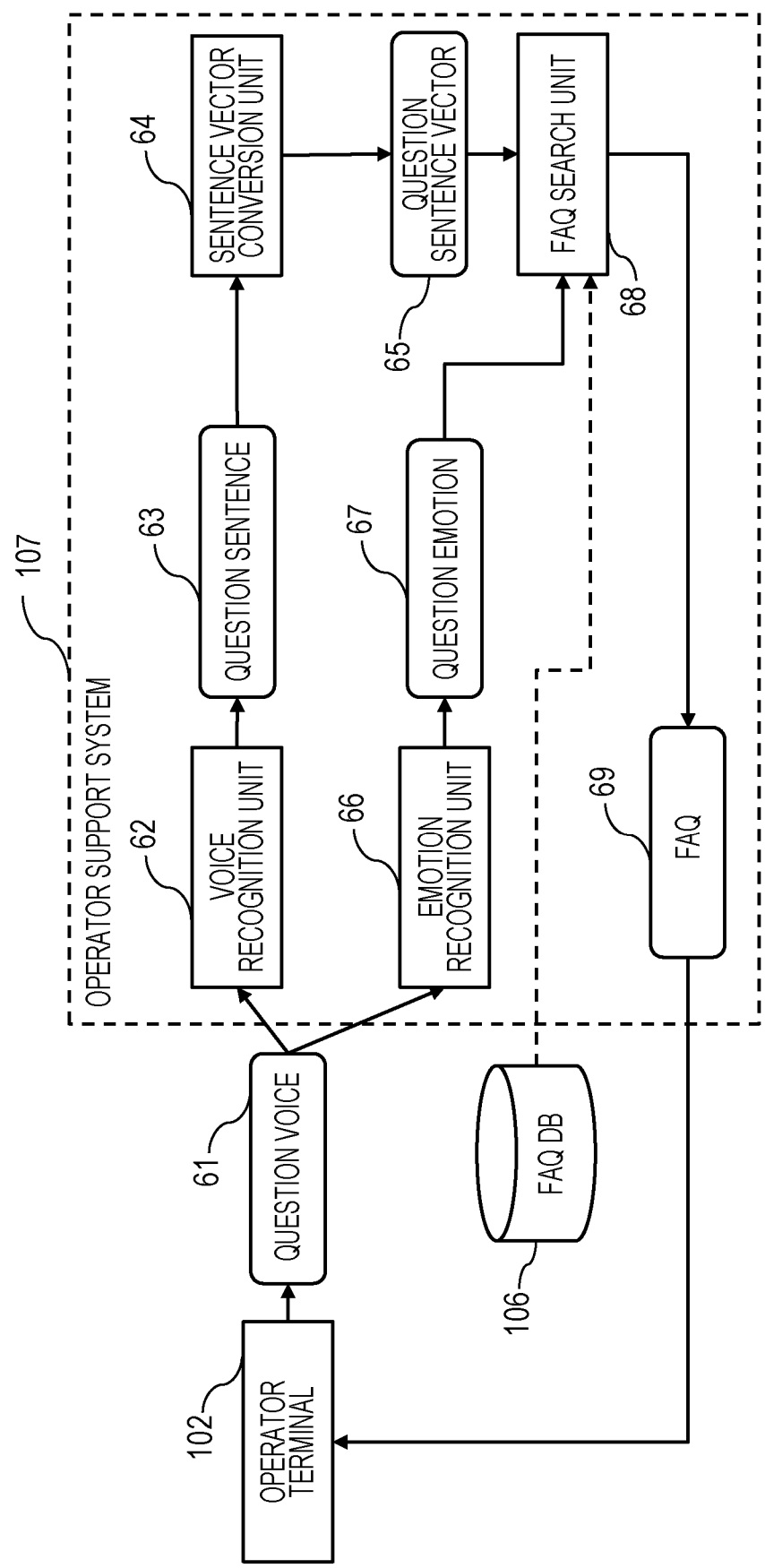
FIG. 8 is a diagram illustrating a functional configuration example of an operator support system according to the first embodiment and an outline example of processing by the operator support system.

FIG. 8 is a diagram illustrating a functional configuration example of the operator support system 107 and a schematic example of processing by the operator support system 107. The operator support system 107 includes, for example, a voice recognition unit 62, a sentence vector conversion unit 64, an emotion recognition unit 66, and an FAQ search unit 68, all of which are function units.

The voice recognition unit 62 selects and acquires a question voice 61 to be searched for input to the operator support system 107 by the operator terminal 102, and generates the question sentence 63 from the question voice 61 using, for example, the similar method to the above-described voice recognition method by the voice recognition unit 42 of the FAQ generation system 105.

The sentence vector conversion unit 44 converts a question sentence 63 into a question sentence vector 65 using an algorithm similar to the algorithm used by the sentence vector conversion unit 44 of the FAQ generation system 105, and inputs them to the FAQ search unit 68. The emotion recognition unit 66 generates a question emotion 67 (emotion vector) from the question voice 61 using an algorithm similar to the algorithm used by the emotion recognition unit 46 of the FAQ generation system 105, and inputs the generated question emotion 67 to the FAQ search unit 68.

The FAQ search unit 68 searches the FAQ DB 106 based on the question sentence vector 65 and the question emotion 67 to output the FAQ to the operator terminal 102. Details of the FAQ search process by the FAQ search unit 68 will be described later with reference to FIG. 9. The operator terminal 102 displays the FAQ output by the FAQ search unit 68 on the output device 150 of the operator terminal 102.

Figure 9:
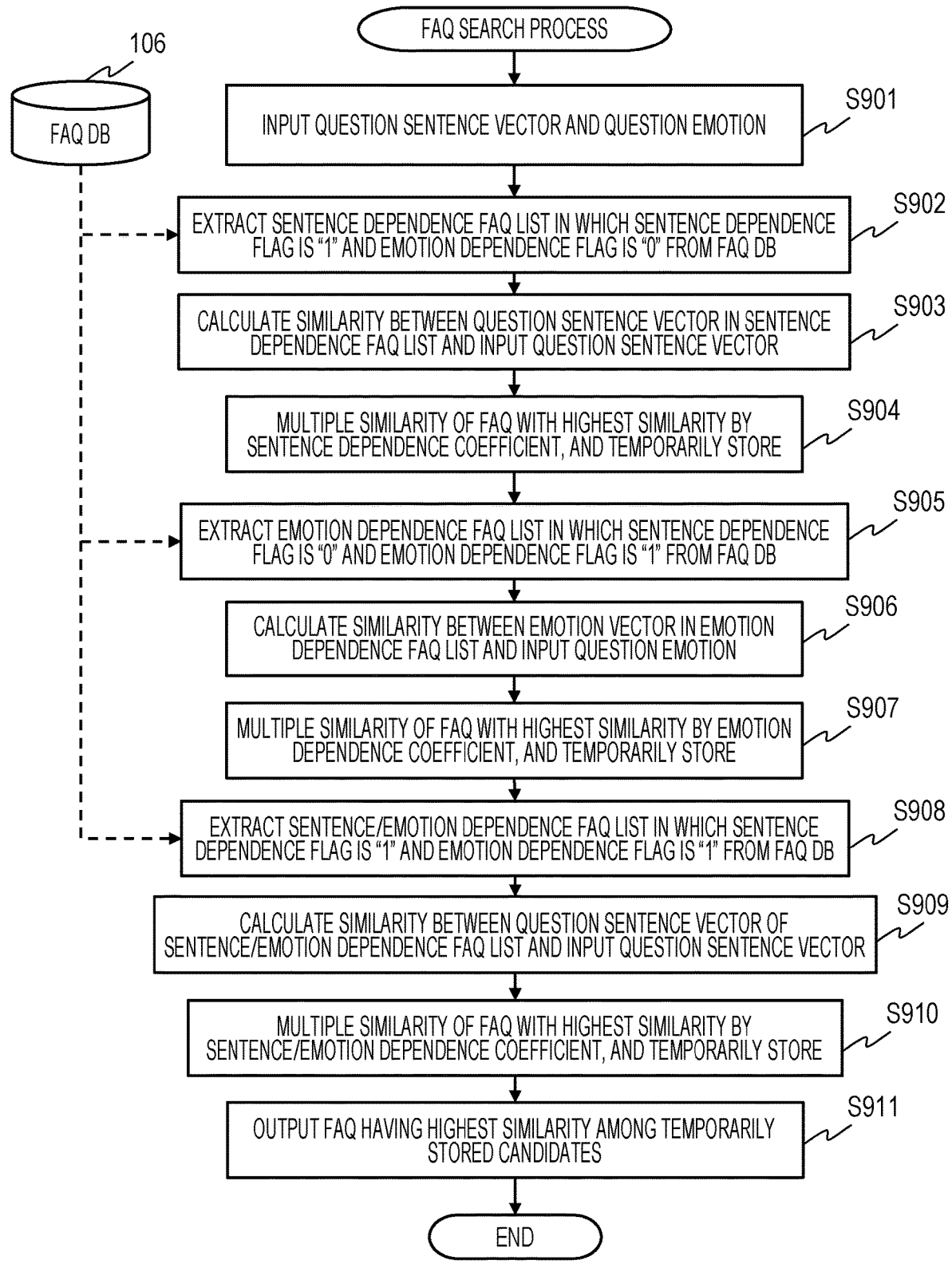
FIG. 9 is a flowchart illustrating an example of an FAQ search process in the first embodiment.

FIG. 9 is a flowchart illustrating an example of the FAQ search process. The FAQ search unit 68 receives inputs of the question sentence vector 65 and the question emotion 67 (S901). The FAQ search unit 68 extracts, from the FAQ DB 106, a record in which the sentence dependence flag is "1" and the emotion dependence flag is "0" as a sentence dependence FAQ list (S902).

The FAQ search unit 68 calculates similarity (for example, cosine similarity, an example of the first similarity) between each question sentence vector included in the sentence dependence FAQ list and the question sentence vector input in step S901 (S903).

For example, the FAQ search unit 68 calculates a value obtained by multiplying the highest value among the similarities calculated in step S903 by a sentence dependence coefficient (a predetermined weight corresponding to the sentence dependence), and temporarily stores the calculated value and the FAQ corresponding to the highest similarity included in the sentence dependence FAQ list in the memory 120 of the operator support system 107 (S904).

The FAQ search unit 68 extracts, from the FAQ DB 106, a record in which the sentence dependence flag is "0" and the emotion dependence flag is "1" as an emotion dependence FAQ list (S905). The FAQ search unit 68 calculates similarity (for example, cosine similarity, an example of the second similarity) between each emotion vector included in the emotion dependence FAQ list and the question emotion (emotion vector) input in step S901 (S906).

For example, the FAQ search unit 68 calculates a value obtained by multiplying the highest value among the similarities calculated in step S906 by an emotion dependence coefficient (a predetermined weight corresponding to the emotion dependence), and temporarily stores the calculated value and the FAQ corresponding to the highest similarity included in the emotion dependence FAQ list in the memory 120 of the operator support system 107 (S907).

The FAQ search unit 68 extracts, from the FAQ DB 106, a record in which the sentence dependence flag is "1" and the emotion dependence flag is "1" as a sentence/emotion dependence FAQ list (S908). The FAQ search unit 68 calculates similarity (for example, cosine similarity, an example of the third similarity) between each question sentence vector included in the sentence/emotion dependence FAQ list and the question sentence input in step S901 (S909).

Note that, in step S909, the FAQ search unit 68 may calculate similarity between each emotion vector included in the sentence/emotion dependence FAQ list and the question emotion (emotion vector) input in step S901, or may calculate similarity obtained by combining similarity between question sentences and similarity between emotion vectors.

For example, the FAQ search unit 68 calculates a value obtained by multiplying the highest value among the similarities calculated in step S909 by a sentence/emotion dependence coefficient (a predetermined weight corresponding to the sentence/emotion dependence), and temporarily stores the calculated value and the FAQ corresponding to the highest similarity included in the sentence/emotion dependence FAQ list in the memory 120 of the operator support system 107 (S910).

The FAQ search unit 68 outputs, to the operator terminal 102, an FAQ corresponding to the highest similarity among similarities multiplied by the coefficient temporarily stored in steps S904, S907, and S910 (S911), and the FAQ search process ends.

Note that, for example, in steps S904, S907, and S910, the FAQ search unit 68 may temporarily store similarity (or a value multiplied by a coefficient) equal to or greater than a predetermined value and an FAQ corresponding to the similarity (or the value multiplied by a coefficient) equal to or greater than the predetermined value, or may temporarily store a predetermined number of similarities (or values multiplied by coefficients) in descending order of values and FAQs corresponding to the predetermined number of similarities (or values multiplied by coefficients).

In addition, the FAQ search unit 68 may compare and temporarily store the similarity without multiplying the similarity by a coefficient in steps S904, S907, and S910.

Furthermore, in step S911, the FAQ search unit 68 may output all the FAQs temporarily stored in steps S904, S907, and S910 to the operator terminal 102.

Furthermore, in step S911, for example, the FAQ search unit 68 may transmit the values in all the columns of the record corresponding to the FAQ of the FAQ DB 106 as the FAQ to be transmitted to the operator terminal 102, or may transmit at least one (however, it is desirable that the answer sentence be always included) of the title, the question sentence, the emotion, and the answer sentence indicated by the record. Furthermore, in step S911, the FAQ search unit 68 may transmit the value of the sentence dependence flag and the value of the emotion dependence flag indicated by the record together to the operator terminal 102.

By executing the above-described FAQ search process, the FAQ search unit 68 can search for an FAQ that matches a question sentence from a customer and a question emotion and present the FAQ to the operator terminal 102. Specifically, the FAQ search unit 68 can search for an appropriate FAQ from an FAQ that depends only on a question sentence, an FAQ that depends only on a question emotion, and an FAQ that depends on a question sentence and a question emotion.

The present invention is not limited to the embodiments described above, but includes various modifications. For example, the above-described embodiments have been described in detail for easy understanding of the present invention, and the present invention is not necessarily limited to embodiments having all the configurations described. Moreover, it is possible to replace part of the configuration of an embodiment with the configuration of another embodiment, and it is also possible to add the configuration of another embodiment to the configuration of an embodiment. Further, it is possible to add, delete, and replace another configuration with respect to part of the configuration of each embodiment.

Further, part or all of the above-described respective configurations, functions, processing units, processing means and the like may be realized by hardware, for example, by designing them with an integrated circuit. Further, the above-described respective configurations, functions, and the like may be realized by software with the processor interpreting and executing programs for realizing the respective functions. Information such as programs, tables, and files that implement each function is stored in memory and it can be placed in a recording device such as a hard disk or a solid state drive (SSD), or a recording medium such as an IC card, an SD card, or a DVD.

In addition, the control lines and the information lines indicate what is considered to be necessary for the description, and do not necessarily indicate all the control lines and the information lines on the product. In practice, it may be considered that almost all configurations are connected to each other.

What is claimed is:

1. A dialogue support system comprising:
a processor; and
a memory, wherein
the memory holds a plurality of question/answer pair candidates each including a question sentence vector indicating a sentence of question by a questioner, an emotion vector indicating a question emotion that is an emotion of the questioner when the question is asked, and an answer sentence vector indicating a sentence of an answer to the question by a respondent, and question/answer pair information in which a question/answer pair is stored, and
the processor
generates, from the plurality of question/answer pair candidates, a first group based on similarity between the answer sentence vectors and similarity between the question sentence vectors, and a second group based on similarity between the answer sentence vectors and similarity between the emotion vectors,
stores, in a case where it is determined that a variance of the emotion vectors of question/answer pair candidates included in the first group is large based on a predetermined condition, a question/answer pair based on the question/answer pair candidates included in the first group in the question/answer pair information as a sentence dependence question/answer pair in which an answer sentence to a question depends on a sentence of the question,
stores, in a case where it is determined that a variance of the question sentence vectors of question/answer pair candidates included in the second group is large based on a predetermined condition, a question/answer pair based on the question/answer pair candidates included in the second group in the question/answer pair information as an emotion dependence question/answer pair in which an answer sentence to a question depends on the question emotion corresponding to the question,
receives a search instruction including a question sentence vector and an emotion vector,
selects a question/answer pair as a search result for the search instruction from the question/answer pair information based on first similarity between a question sentence vector of the sentence dependence question/answer pair stored in the question/answer pair information and a question sentence vector included in the search instruction, second similarity between an emotion vector of the emotion dependence question/answer pair stored in the question/answer pair information and an emotion vector included in the search instruction, and third similarity between a question sentence vector of the sentence/emotion dependence question/answer pair stored in the question/answer pair information and a question sentence vector included in the search instruction, and
outputs an answer sentence indicated by an answer sentence vector included in the selected question/answer pair.

2. The dialogue support system according to claim 1, wherein
the processor
generates, from the plurality of question/answer pair candidates, a third group based on similarity between the answer sentence vectors, similarity between the question sentence vectors, and similarity between the emotion vectors, and
stores a question/answer pair based on question/answer pair candidates included in the third group in the question/answer pair information as a sentence/emotion dependence question/answer pair in which an answer sentence to a question depends on a sentence of the question and the question emotion corresponding to the question.

3. The dialogue support system according to claim 1, wherein
the memory holds a dialogue sentence vector indicating a sentence of a dialogue between the questioner and the respondent, and a questioner emotion indicating an emotion of the questioner when an utterance by the questioner is being made in the dialogue, and
the processor
extracts an utterance indicating a question by the questioner in the dialogue or an expression of an emotion of the questioner in the dialogue based on the dialogue sentence vector and the questioner emotion,
extracts an utterance indicating an answer by the respondent, the utterance corresponding to the extracted utterance or the extracted expression of the emotion, based on the dialogue sentence vector, determines, as the question sentence vector in the question/answer pair candidates, a vector indicating a sentence of an utterance by the questioner indicated by the dialogue sentence vector when the extracted utterance or the extracted expression of the emotion is made, determines, as the emotion vector in the question/answer pair candidates, a vector indicating the questioner emotion when the extracted utterance or the extracted expression of the emotion is made, and determines a vector indicating a sentence of the extracted utterance indicating the answer by the respondent as the answer sentence vector in the question/answer pair candidates.

4. The dialogue support system according to claim 1, wherein the processor calculates a sentence dependence degree indicating a degree of dependence of an answer sentence to a question in the sentence dependence question/answer pair on a sentence of the question based on a reciprocal of a variance of question sentence vectors included in the first group and stores the calculated sentence dependence degree in the question/answer pair information in a case where the sentence dependence question/answer pair is stored in the question/answer pair information, and calculates an emotion dependence degree indicating a degree of dependence of an answer sentence to a question in the emotion dependence question/answer pair on the question emotion corresponding to the question based on a reciprocal of a variance of emotion vectors included in the second group and stores the calculated emotion dependence degree in the question/answer pair information in a case where the emotion dependence question/answer pair is stored in the question/answer pair information.

5. A dialogue support method performed by a dialogue support system, wherein the dialogue support system includes a processor and a memory, and the memory holds a plurality of question/answer pair candidates each including a question sentence vector indicating a sentence of question by a questioner, an emotion vector indicating a question emotion that is an emotion of the questioner when the question is asked, and an answer sentence vector indicating a sentence of an answer to the question by a respondent, and question/answer pair information in which a question/answer pair is stored, and the dialogue support method comprising the steps of:

generating, from the plurality of question/answer pair candidates, a first group based on similarity between the answer sentence vectors and similarity between the question sentence vectors, and a second group based on similarity between the answer sentence vectors and similarity between the emotion vectors, storing, in a case where it is determined that a variance of the emotion vectors of question/answer pair candidates included in the first group is large based on a predetermined condition, a question/answer pair based on the question/answer pair candidates included in the first group in the question/answer pair information as a sentence dependence question/answer pair in which an answer sentence to a question depends on a sentence of the question, and storing, in a case where it is determined that a variance of the question sentence vectors of question/answer pair candidates included in the second group is large based on a predetermined condition, a question/answer pair based on the question/answer pair candidates included in the second group in the question/answer pair information as an emotion dependence question/answer pair in which an answer sentence to a question depends on the question emotion corresponding to the question, receiving a search instruction including a question sentence vector and an emotion vector, selecting a question/answer pair as a search result for the search instruction from the question/answer pair information based on first similarity between a question sentence vector of the sentence dependence question/answer pair stored in the question/answer pair information and a question sentence vector included in the search instruction, second similarity between an emotion vector of the emotion dependence question/answer pair stored in the question/answer pair information and an emotion vector included in the search instruction, and third similarity between a question sentence vector of the sentence/emotion dependence question/answer pair stored in the question/answer pair information and a question sentence vector included in the search instruction, and outputting an answer sentence indicated by an answer sentence vector included in the selected question/answer pair.

6. The dialogue support method according to claim 5, further comprising the steps of:

generating, from the plurality of question/answer pair candidates, a third group based on similarity between the answer sentence vectors, similarity between the question sentence vectors, and similarity between the emotion vectors, and storing a question/answer pair based on question/answer pair candidates included in the third group in the question/answer pair information as a sentence/emotion dependence question/answer pair in which an answer sentence to a question depends on a sentence of the question and the question emotion corresponding to the question.

7. The dialogue support method according to claim 5, wherein the memory holds a dialogue sentence vector indicating a sentence of a dialogue between the questioner and the respondent, and a questioner emotion indicating an emotion of the questioner when an utterance by the questioner is being made in the dialogue, and the dialogue support method further comprising the steps of:

extracting an utterance indicating a question by the questioner in the dialogue or an expression of an emotion of the questioner in the dialogue based on the dialogue sentence vector and the questioner emotion, extracting an utterance indicating an answer by the respondent, the utterance corresponding to the extracted utterance or the extracted expression of the emotion, based on the dialogue sentence vector, determining, as the question sentence vector in the question/answer pair candidates, a vector indicating a sentence of an utterance by the questioner indicated by the dialogue sentence vector when the extracted utterance or the extracted expression of the emotion is made, determining, as the emotion vector in the question/answer pair candidates, a vector indicating the questioner emotion when the extracted utterance or the extracted expression of the emotion is made, and determining a vector indicating a sentence of the extracted utterance indicating the answer by the respondent as the answer sentence vector in the question/answer pair candidates.

8. The dialogue support method according to claim 5, further comprising the steps of:

calculating a sentence dependence degree indicating a degree of dependence of an answer sentence to a question in the sentence dependence question/answer pair on a sentence of the question based on a reciprocal of a variance of question sentence vectors included in the first group and stores the calculated sentence dependence degree in the question/answer pair information in a case where the sentence dependence question/answer pair is stored in the question/answer pair information, and calculating an emotion dependence degree indicating a degree of dependence of an answer sentence to a question in the emotion dependence question/answer pair on the question emotion corresponding to the question based on a reciprocal of a variance of emotion vectors included in the second group and stores the calculated emotion dependence degree in the question/answer pair information in a case where the emotion dependence question/answer pair is stored in the question/answer pair information.

* * * * *